United States Patent [19]
Zentz, Jr.

[11] 3,856,563
[45] Dec. 24, 1974

[54] OPACITY OF CLAY FILMS

[75] Inventor: William E. Zentz, Jr., Iselin, N.J.

[73] Assignee: Engelhard Minerals & Chemicals Corporation, Woodbridge, N.J.

[22] Filed: Mar. 18, 1974

[21] Appl. No.: 451,954

Related U.S. Application Data

[62] Division of Ser. No. 270,498, July 10, 1972, Pat. No. 3,816,153.

[52] U.S. Cl............ 117/152, 117/155 UA, 117/156
[51] Int. Cl............................................. D21h 1/10
[58] Field of Search ............ 106/72, 288 B, 308 B; 117/152, 155 UA, 156

[56] References Cited
UNITED STATES PATENTS

| | | | |
|---|---|---|---|
| 2,910,372 | 10/1959 | Ruskin | 106/89 |
| 3,226,252 | 12/1965 | Hemstock | 117/155 UA |
| 3,520,719 | 7/1970 | Horton | 117/152 |
| 3,723,174 | 3/1973 | Swanson et al. | 117/155 UA |

*Primary Examiner*—Michael R. Lusignan
*Attorney, Agent, or Firm*—Melvin C. Flint; Inez L. Moselle

[57] ABSTRACT

A small amount of a bismuth compound is incorporated with kaolin clay during the processing of the clay. The clay product is employed in an aqueous coating composition adapted for coating book or magazine paper in order to increase the opacity of the resulting clay film.

5 Claims, No Drawings

OPACITY OF CLAY FILMS

This is a division, of application Ser. No. 270,498, filed Jul. 10, 1972, now U.S. Pat. No. 3,316,153.

BACKGROUND OF THE INVENTION

The paper rawstock used in making publication grade paper lacks the smoothness, gloss and whiteness required for high quality printing. Especially because of the lack of smoothness the paper is incapable of registering accurately the fine dots used in halftone printing. The most economical method for providing a smooth white surface on paper intended for printing is to coat the paper with a thin film of clay particles. This is accomplished by applying to the rawstock an aqueous "coating color" containing clay pigment, pigment dispersant (deflocculating agent) and suitable adhesive.

Given two or more clay pigments which provide comparable gloss, whiteness, printing smoothness and ink receptivity at similar cost, the coater will normally select the clay pigment which provides the greatest film opacity. By opting for the pigment that produces the most opaque coated sheet, the paper will generally obtain products which will exhibit less strike-through of printed matter from the reverse side of the sheet. Further, there will be less show-through of printed matter in a pile of printed sheets.

It is known that the opacifying or hiding power of kaolin clay varies with the particle size and shape of the clay particles. Moreover, certain processing, especially some grinding techniques, results in kaolin clay pigments of improved opacifying power. It is generally believed, however, that the opacifying power of kaolin pigments is ultimately limited by the refractive index of the clay. Therefore, it has been considered necessary to blend clay pigments with more costly pigments having higher refractive indices in order to increase significantly the opacity of clay coatings.

PRIOR ART

It has been suggested to add certain bismuth salts, notably bismuth chloride salts, to mica in the presence of water to provide nacreous pigments. To the best of my knowledge, the only suggestion for using any bismuth compound with a clay has been the one in which such compound is used to increase the gel strength of aqueous suspensions of swelling bentonite clay.

THE INVENTION

Briefly stated, in accordance with my invention a small amount of a bismuth (+3) salt is mixed with kaolin clay pigment in the presence of water prior to incorporating the clay pigment in a neutral or alkaline aqueous coating composition suitable for coating paper or for water-based paints.

Paper sheet or board coated with a clay coating composition of the present invention has greater hiding power (opacity) than it would have in the absence of the added bismuth compound. By the practice of this invention, clay films having unusually high scattering coefficients have been obtained. The bismuth compound which is added to the clay does not have an adverse effect on the rheology of the clay.

DETAILED DESCRIPTION

Suitable bismuth salts are those which are soluble in acid solution and include bismuth (+3), nitrate, chloride, bromide, sulfate and carbonate. These salts from oxysalts in water, in accordance with the following representative equation:

$$BiCl_3 + H_2O = BiOCl_{(s)} + 2H^+ + 2Cl^-$$

The corresponding oxysalts of the abovementioned bismuth (+3) salts may be used and they will generally revert to normal salts when incorporated with acidic clay. The bismuth salt may be formed in situ by adding bismuth hydroxide to an aqueous acidic suspension of the clay.

Recommended is the use of bismuth compound in amount within the range of 0.05 percent to 1 percent, preferably 0.1 percent to 0.5 percent, of the moisture-free weight of the clay. When insufficient bismuth salt is used, the effect on opacity may be minimal. On the other hand, the additive may impair other desired properties of the clay, especially rheology and ink absorption, when used in excessive quantity. A suitable quantity may be determined by a screening process using black glass plates as the substrate for the finished coatings and determining the scattering coefficients of coatings formulated with various proportions of additives. A publication setting forth details of the procedure appears hereinafter.

In one especially preferred embodiment of the invention, the bismuth salt is used with a specific type of kaolin clay which is characterized by extremely fine particle size and outstanding glossing properties. The clay is frequently described in the clay art as "hard clay." When used in conventional coating color formulations, films containing the hard clay are glossier than those obtained with conventional soft kaolin clay coating pigments. However, the films with the hard clay lack the opacity obtainable with soft clay. When a suitable bismuth salt is used with a hard clay pigment, the coated films may be comparable in opacity to films obtained with the soft clays and they are frequently even glossier than the high gloss films obtained when hard clay is used in a conventional formulation. Thus, novel coatings featuring the combination of outstanding gloss and opacity are provided.

In another preferred embodiment, the bismuth compound is used with ground or mechanically delaminated kaolin clay which normally has high opacity. The use of the bismuth compound may improve film opacity to the extent that coat weight may be reduced.

In another preferred embodiment, the bismuth compound is employed with No. 2 coating clays (kaolin pigments containing a greater percentage of plus 2 micron particles than No. 1 coating clays) to provide coatings having properties, especially opacity, comparable to those obtained with the finer No. 1 coating clay.

In another embodiment of the invention, the bismuth compound is incorporated with a high brightness fine size fraction of soft kaolin clay to achieve, in effect, a coated film having the hiding power comparable to that of a film including a pigment having a higher refractive index than kaolin clay.

In carrying out my invention, the bismuth salt is mixed with the clay pigment, preferably in the presence of water, before the pigment is deflocculated completely by addition of a dispersing agent such as a sodium condensed phosphate salt and then mixed with a suitable binder system to form a coating composition.

In practicing the invention, the conventional wet-processing may be modified merely by adding the bismuth compound as a solid or aqueous solution to a moist acidic filter cake of bleached kaolin clay before a condensed phosphate or other deflocculating agent is incorporated. The processing after addition of the bismuth compound to the cake will cary, depending upon whether the clay is to be supplied in acid or predispersed form. As another possibility, the bismuth compound can be added to a bleached kaolin clay suspension before the suspension is filtered.

An acid clay pigment may be obtained by drying the treated filter cake, grinding and pulverizing the dry mixture. In use the acid pigment containing the additive would be prepared into a deflocculated slurry by mixing the pigment with water and a condensed phosphate dispersing agent.

The usual practice of incorporating an "optimum" proportion of condensed phosphate dispersant may be followed in practicing this invention. An "optimum" proportion of dispersant is the minimum quantity that results in a clay-water slip of desired solids content which possesses minimum high shear viscosity. The high shear viscosity is usually measured by a Hercules or Hagan instrument. Sodium, potassium and ammonium condensed phosphate salts may be used. For reasons of economy, the sodium salts are generally employed. Examples of sodium salts are sodium hexametaphosphate, sodium tripolyphosphate and tetrasodium pyrophosphate.

Suitable proportions of condensed phosphate salt vary for example with the origin and the processing of the clay and with the solids content of the slurry. Generally condensed phosphate dispersants are employed in amounts within the range of 0.1 perent to 0.5 percent of the clay weight.

It is within the scope of the invention to employ a synthetic organic polyanionic dispersant along with a condensed phosphate salt to deflocculate the clay-water system.

In preparing coating colors, conventional adhesives or mixture of adhesives may be used. The adhesive functions to bind the clay particles to the substrate. Examples of adhesives are synthetic latices, e.g., styrene-butadiene, acrylics, starch (cooked or raw) and casein. The adhesives are formed into aqueous suspensions or dispersions before they are mixed with the deflocculated clay slip containing the bismuth additive.

Conventional proportions of pigment and adhesive may be used. The following examples are given for illustrative purposes and are not considered to be limiting upon the invention.

EXAMPLE I

In this example, the starting clay was a commercial sandground, pulverized acid grade of kaolin coating pigment supplied under the name "Lamina". The clay was prepared by the grinding procedure described in U.S. Pat. No. 3,097,081 to Duke and was bleached with zinc hydrosulfite at an acidic pH, filtered and washed. The clay was about 80 percent finer than 2 microns (equivalent spherical diameter).

One sample of the "Lamina" was processed, in accordance with the invention, as follows. To 106 grams water, 0.5 gram $BiCNO_3)_3.5H_2O$ was added with mixing, producing a cloudy white suspension. To the suspension "Lamina" was gradually added with mild agitation until the system thickened. Then tetrasodium pyrophosphate was added in small increments (about 0.05 percent based on the clay weight for each increment), followed by mixing, and incremental addition of more dry clay until a fluid clay suspension containing 65.5 percent clay solids was obtained. The suspension contained 0.45 percent tetrasodium pyrophosphate based on the dry clay weight. The pH was 5.7. Bismuth nitrate hydrate was present in amount of 0.25 percent, based on the dry clay weight.

A control suspension (66.9 percent solids) was prepared in conventional manner. The control had a pH of 6.2 and contained 0.34 percent tetrasodium pyrophosphate. This suspension was made down by conventional high shear mixing procedures.

Both suspensions had acceptable low shear and high shear viscosities.

Portions of the deflocculated suspensions were prepared into starch coating colors (49.9 percent solids) by mixing with PenFord Gum 280 in amount corresponding to 17 parts by weight of the starch solids to 100 parts by weight clay solids. The pH of both coating colors was 7.0. The two coating colors had substantially the same Hercules end point viscosities. The Brookfield viscosities (10 r.p.m. and 100 r.p.m. with No. 4 spindle) of the experimental color were slightly lower.

The colors were coated on the felt side of St. Regis basestock (24 lbs./ream 3300 ft.$^2$) to a coat weight of 4.91 lb./3,300 ft.$^2$ in the case of the control and 4.84 lb./3,300 ft.$^2$ for the experimental color. Brightness was measured by the standard TAPPI procedure, using an Elrapho meter. B & L opacity was determined in conventional manner, using eight scans per sheet.

Portions of the coated sheets were supercalendered at 75°F., using 3 nips at 500 lbs. per lineal inch. The 75° gloss, B and L opacity and brightness were measured.

Results are summarized in table form.

Opacity and brightness data in the table show that the addition of bismuth nitrate to the clay before makedown resulted in a significant increase in calendered and uncalendered brightness and opacity. 75° gloss was increased.

Portions of the control and experimental coating colors were coated side-by-side on lacquered, "Lenata," black and white opacity charts to a thickness of 1½ mil. Portions of the coatings were over black strips on board and others were over coated board. Visual observation of the coatings against both white and black backgrounds showed that the coatings made with the experimental clay were significantly more opaque. The procedure was repeated with heavier coatings (3 mil). In this case the contrast between the opacities was more striking and the experimental coatings were also visually whiter.

TABLE

EFFECT OF ADDITION OF BISMUTH NITRATE TO COATING CLAY
BEFORE MAKEDOWN ON THE OPTICAL PROPERTIES OF COATED PAPER

|  | Control | Control & 0.25% $Bi(NO_3).5H_2O$ | Δ* |
|---|---|---|---|
| Properties of Uncalendered Sheets |  |  |  |
| Brightness (Elrepho), % | 68.1 | 69.1 | 1.0 |
| B & L Opacity, % | 88.9 | 89.8 | 0.9 |

TABLE — Continued

EFFECT OF ADDITION OF BISMUTH NITRATE TO COATING CLAY BEFORE MAKEDOWN ON THE OPTICAL PROPERTIES OF COATED PAPER

|  | Control | Control & 0.25% $Bi(NO_3).5H_2O$ | Δ* |
|---|---|---|---|
| Properties of Calendered Sheets |  |  |  |
| 75° Gloss, % | 32.7 | 33.6 | 0.9 |
| B & L Opacity, % | 87.9 | 88.7 | 0.8 |
| Brightness (Elrepho), % | 66.8 | 67.7 | 0.9 |

* Increase over control.

EXAMPLE II

The following example shows the benefit of treating an ultrafine hard kaoline clay pigment with a bismuth salt before makedown. The pigment was obtained from a hard gray kaolin clay crude from a mine near McIntyre, Georgia. The crude was blunged in water, fractionated to about 100 percent minus 2 microns, deflocculated and beneficiated by froth flotation with an anionic collector. The floatation tailings were separated from the froth (a concentrate of yellow anatase impurity) and the tailings were thickened by adding acid to flocculate the clay and remove water from the flocs. The flocs were then bleached by adding potassium permanganate solution and then zinc hydrosulfite solution, in the presence of sulfuric acid, as described in U.S. Pat. No. 3,353,668 to James B. Duke. The bleached beneficiated hard clay was filtered and washed.

A 56.0 percent solids slurry of the bleached beneficiated hard kaolin clay was prepared by agitating a portion of the acid filter cake with $Bi(NO_3)_3.5H_2O$, added as a solid, in amount of 0.50 percent of the dry weight of the clay.

The treated clay was prepared into a high solids (71 percent) slip by agitating it in water containing tetrasodium pyrophosphate in amount of 0.3 percent, based on the dry weight of the clay.

A 60 percent solids coating color was prepared by diluting the 71 percent solids dispersed slip with water, mixing and then adding a styrene-butadiene latex suspension ("Dow 620 Latex") in amount corresponding to 18 parts by weight latex solids to 100 parts by weight clay solids. The pH of the coating color was 8.2.

A control coating color without any bismuth salt additive was prepared from predispersed hard clay obtained by slurrying another portion of the same filter cake in water containing tetrasodium pyrophosphate (based on the dry clay weight).

The control coating color and the experimental coating color containing clay treated with bismuth nitrate were separately coated on five block glass plates as described in an article by G. A. Hemstock and R. J. Bergmann, "STUDIES OF RELATIONSHIPS BETWEEN SUSPENSION AND PAPER COATING FILM PROPERTIES," TAPPI, November 1968, Vol. 511, No. 11, pages 489 to 496. Gloss measurements (75°) were made with a Hunter Gloss Meter and brightness was obtained with an Elrepho Brightness Meter. Coat weeight of the coating on each plate was determined. From the value of the reflectance of the coating over a black body and the coat weight on the plate the scattering coefficient ($s$) was computed using the equation given at page 491 in the TAPPI article by Hemstock et al., (supra). Mean scattering coefficients were calculated from the $s$ values for the five plates.

The mean scattering coefficient of the coatings prepared with predispersed hard clay containing 0.5 percent by weight bismuth nitrate additive was 0.14 ream/lb. The mean scattering coefficient of the control coatings was only 0.11 ream/lb. A comparison of these values shows that the use of bismuth nitrate during clay processing resulted in a clay coating having a significantly greater scattering coefficient and thus more reflecting interfaces. Since opacity is evaluated quantitatively by scattering coefficient, the results indicate that the bismuth salt additive will markedly improve the opacity and hiding power of clay coatings.

I claim:

1. In the preparation of clay-coated paper wherein a coating composition comprising water, kaolin clay, adhesive binder and clay deflocculating agent is prepared and the composition is coated on paper and dried, the improvement which comprises incorporating a small amount of a hydrolyzable bismuth (+3) salt with the clay before an aqueous slip of said clay is deflocculated, the amount of said salt being sufficient to increase the opacity of a sheet coated with said coating composition.

2. The method of claim 1 wherein bismuth salt is bismuth nitrate.

3. The method of claim 1 wherein said bismuth salt is incorporated in amount within the range of 0.05 percent to 1 percent of the dry clay weight.

4. The method of claim 1 wherein said bismuth salt is incorporated in amount within the range of 0.1 percent to 0.5 percent of the dry clay weight.

5. The method of claim 1 wherein said coating composition is prepared by incorporating said bismuth salt with water and an acidic kaolin clay, thereafter incorporating a deflocculating agent to form a fluid slip and making the slip with an aqueous suspension of adhesive.

* * * * *